(12) United States Patent
Russell et al.

(10) Patent No.: US 10,576,410 B2
(45) Date of Patent: Mar. 3, 2020

(54) USE OF REFINERY FUEL GAS TO IMPROVE STEAM REFORMER PRESSURE SWING ADSORPTION PROCESSES

(71) Applicant: UOP LLC, Des Plaines, IL (US)

(72) Inventors: Bradley P. Russell, Wheaton, IL (US); Margaret A. Stine, Mount Prospect, IL (US); David A. Wegerer, Lisle, IL (US); Gautam Pandey, Gurgaon (IN)

( * ) Notice: Subject to any disclaimer, the term of this patent is extended or adjusted under 35 U.S.C. 154(b) by 192 days.

(21) Appl. No.: 15/880,376

(22) Filed: Jan. 25, 2018

(65) Prior Publication Data

US 2019/0224612 A1 Jul. 25, 2019

(51) Int. Cl.
| | |
|---|---|
| *B01D 53/047* | (2006.01) |
| *C10G 35/22* | (2006.01) |
| *C10G 35/04* | (2006.01) |
| *B01D 53/04* | (2006.01) |
| *C01B 3/56* | (2006.01) |

(52) U.S. Cl.
CPC ....... *B01D 53/047* (2013.01); *B01D 53/0462* (2013.01); *C01B 3/56* (2013.01); *C10G 35/04* (2013.01); *C10G 35/22* (2013.01); *B01D 2256/16* (2013.01); *B01D 2259/4145* (2013.01); *C10G 2400/28* (2013.01)

(58) Field of Classification Search
CPC .. B01D 53/047; B01D 53/0462; B01D 53/22; B01D 2253/104; B01D 2253/106; B01D 2256/16; B01D 2259/4141; B01D 2259/4145; B01D 2259/4146; C01B 3/02; C01B 3/50; C01B 3/56; C10G 35/04; C10G 35/22; C10G 2400/28

USPC ..... 96/110, 121, 122, 130, 132, 134, 136, 4; 95/96

See application file for complete search history.

(56) References Cited

U.S. PATENT DOCUMENTS

| | | | |
|---|---|---|---|
| 2008/0072752 A1* | 3/2008 | Kumar | B01D 53/0476 95/103 |
| 2010/0011955 A1* | 1/2010 | Hufton | B01D 53/047 95/136 |
| 2013/0205828 A1* | 8/2013 | Sethna | F25J 1/0022 62/607 |
| 2019/0225895 A1* | 7/2019 | Wegerer | B01D 53/0462 |

OTHER PUBLICATIONS

Broadhurst et.al., Refinery fuel gas in steam reforming hydrogen plants, Catalysis 2012.

\* cited by examiner

*Primary Examiner* — Frank M Lawrence, Jr.

(57) ABSTRACT

A process is disclosed for producing hydrogen for a hydrogen consuming process comprising obtaining a gas stream containing hydrogen from a steam reforming hydrogen plant, sending the gas stream to a pressure swing adsorption unit to be separated into a hydrogen stream and a fuel gas stream; purging the pressure swing adsorption unit with an external purge gas stream from a hydroprocessing unit off gas; treating the off gas with a thermal swing adsorption unit to remove water and other impurities prior to purging the pressure swing adsorption unit; and using a protective adsorbent layer in the pressure swing adsorption unit at the product-hydrogen end of the bed to adsorb impurities from the external purge gas.

18 Claims, 3 Drawing Sheets

USE OF REFINERY FUEL GAS TO IMPROVE STEAM REFORMER PRESSURE SWING ADSORPTION PROCESSES

BACKGROUND OF THE INVENTION

This invention relates to a process for integrating pressure swing adsorption into stream reformer hydrogen production. More specifically, a single fuel gas stream is a source of external purge gas for multiple pressure swing adsorption units in a refinery or other type of complex.

Prior to use as pressure swing adsorption (PSA) purge, the refinery fuel gas stream is treated in a thermal swing adsorption (TSA) unit and a membrane unit to remove water, hydrocarbons, and other contaminants. As discussed in this disclosure, the membrane non-permeate stream can be used as feedstock for the steam reformer hydrogen plant.

This invention integrates a refinery unit (e.g., hydrocracker) with a steam reformer hydrogen plant in order to: (1) increase product hydrogen recovery from the steam reformer plant, and (2) recover hydrocarbons from a refinery fuel gas stream (as liquid product or steam reformer feedstock). This invention can be applied to both new steam reformer units and also to revamps of existing steam reformer plants.

SUMMARY OF THE INVENTION

The invention involves a process for producing hydrogen for a hydrogen consuming process comprising obtaining a gas stream containing hydrogen from a steam reforming hydrogen plant, sending the gas stream to a pressure swing adsorption unit to be separated into a hydrogen stream and a fuel gas stream, purging the pressure swing adsorption unit with an external purge gas stream from a hydroprocessing unit off gas, treating the off gas with a thermal swing adsorption unit to remove water and other impurities prior to purging the pressure swing adsorption unit, and using a protective adsorbent layer at the product hydrogen end of the bed in the pressure swing adsorption unit to adsorb impurities from the external purge gas. The external purge gas stream may be a flash gas stream from a hydrocracking reactor or from a hydrotreating reactor. The external purge gas stream may be at a pressure of about 5 psig to 40 psig when entering the pressure swing adsorption unit. The hydrogen that is separated may be sent to one or more reactors selected from the group consisting of a hydrocracking reactor, a hydrotreating reactor, an aromatics conversion reactor, and an isomerization reactor. The treated purge gas stream is sent through a membrane unit to produce a non-permeate stream depleted in hydrogen and a permeate hydrogen stream to be sent as the external purge gas stream through the pressure swing adsorption unit. The treated purge gas stream is at a pressure of about 200 to 600 psig. The temperature swing adsorption unit may be regenerated with a gas stream from the non-permeate stream. The protective adsorbent layer may comprise from about 5% to 25% of the pressure swing adsorption unit bed volume. The protective adsorbent layer may comprise silica gel, activated alumina, or other suitable adsorbent. The non-permeate stream may be chilled to about 0 to 20° C. to produce a liquid hydrocarbon stream. The liquid stream may be sent to a fractionation section of a hydroprocessing unit to recover liquefied petroleum gas and light naphtha. The liquid stream may be sent to a fractionation section of a catalytic reforming unit to recover liquefied petroleum gas and light naphtha.

DETAILED DESCRIPTION OF THE INVENTION

Figure 1:
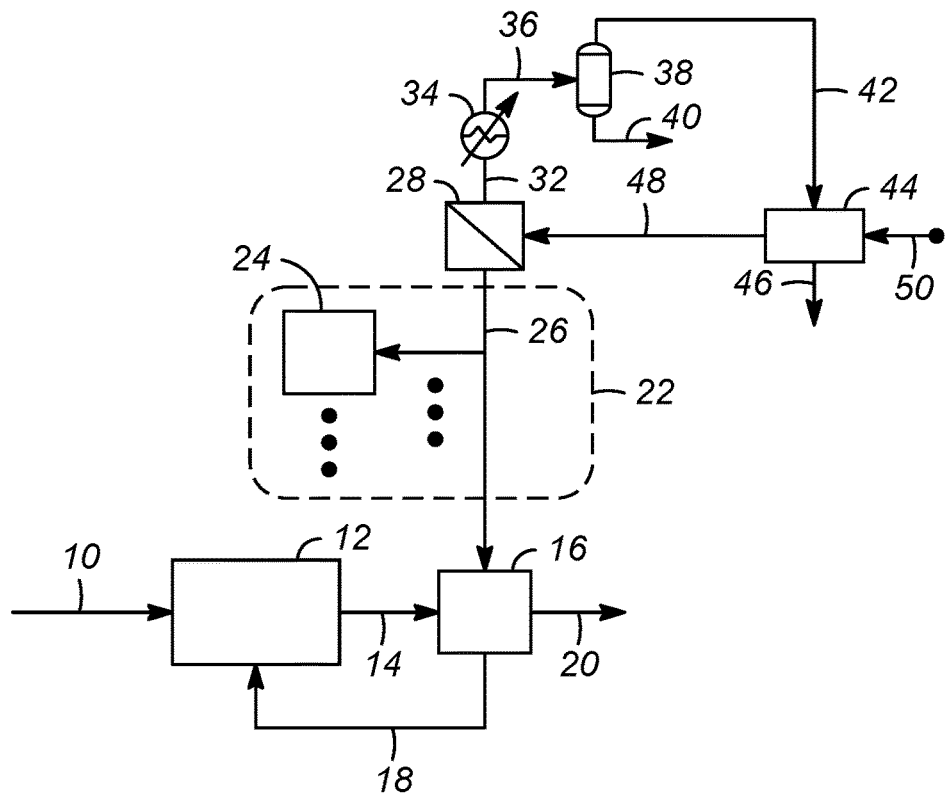
FIG. 1 shows a flow scheme for integration of refinery fuel gas and a steam reformer plant pressure swing adsorption unit with an option for liquids recovery.

In one embodiment of the invention, a single refinery fuel gas (RFG) stream is first treated in a temperature swing adsorption unit to remove water and other trace-level impurities (such as ammonia, carbonyl sulfide, hydrogen sulfide, etc.) that would deactivate the pressure swing adsorption adsorbent. A membrane unit is then used to reject hydrocarbons in a non-permeate stream and recover purified hydrogen in a permeate stream (at about 20 to 60 psig). This permeate stream is used as an external purge gas in a steam-reformer pressure swing adsorption unit and possibly in other pressure swing adsorption units in the facility. As shown in FIG. 1, a chiller is used to condense hydrocarbon liquids from the hydrogen-depleted non-permeate. This liquid stream is sent to the fractionation section in a refinery unit for LPG and light naphtha recovery. In another embodiment of the invention, the non-permeate stream is used as steam reformer plant feedstock.

One possible source of refinery fuel gas is cold flash-gas from a hydrocracker in a refinery. However, other sources of refinery fuel gas can be used, including blended streams. One advantage of the invention is that hydrogen is removed from the refinery fuel gas stream prior to the steam reformer reactor. This lowers hydrogen concentration and thereby increases equilibrium conversion in the steam reforming reaction.

Unique features of this PSA design compared to prior art include: (1) mixing of external purge gas into the existing, internal provide-purge (PP) header, and (2) use of a silica gel or activated alumina layer at the product hydrogen end of the bed as a guard layer. Prior art hydrogen PSA units make use of multiple adsorbents arranged in layers to remove specific contaminants and adsorbent layer order in the direction of feed flow is a critical design specification. A molecular sieve adsorbent, for example, calcium A (5A) or sodium X (13X) type zeolite, is typically the ultimate adsorbent layer in prior art H2 PSA adsorber beds. The function of the silica gel or activated alumina guard layer is to adsorb residual contaminants, such as water, ammonia, hydrogen sulfide, and C2+ hydrocarbons introduced at the product hydrogen end of an adsorber bed via the external purge gas, thereby protecting the molecular sieve adsorbent from trace levels of contaminants. Without this silica gel or activated alumina protective layer, these trace contaminants will deactivate the molecular sieve adsorbent. Deactivation occurs by irreversible adsorption of trace contaminants, thereby reducing adsorption capacity for the main impurities from PSA feed gas, such as carbon monoxide and may result in PSA unit shutdown and adsorbent replacement. The silica gel or activated alumina guard layer at the product hydrogen end of an adsorber serves to adsorb trace contaminants from the external purge gas and then desorb these contaminants into the main PSA product stream at high pressure. Thus, contrary to normal PSA practice, impurities swing from a low-pressure stream (external purge gas) to a high-pressure stream (PSA product). Table 1 shows an example of possible impurity levels of the external purge stream entering the PSA unit.

TABLE 1

Composition of External Purge Gas (99.4 mol % Hydrogen)

| | Concentration, ppmv |
|---|---|
| Methane | 5,000 |
| Ethane | 300 |
| Propane | 200 |
| Butanes | 70 |
| Pentanes | 20 |
| Water | 10 |
| Ammonia | 5 |
| Hydrogen Sulfide | 2 |

The total purge stream that is used to purge an adsorber bed in the PSA cycle is comprised of: (1) internal purge gas, and (2) external purge gas. According to normal practice, the internal purge gas is most commonly obtained from de-pressurizing an adsorber bed in the PSA unit from a high pressure to a lower pressure. This de-pressurization step is typically the final co-current depressurization step in the cycle, and is commonly referred to as the provide-purge (PP) step (as in application Ser. No. 15/880,091, filed Jan. 25, 2018). The external purge gas from the membrane is mixed with the internal purge gas. The flow rate of external purge gas is measured, and the amount of internal purge gas is adjusted in the PSA control program so as to obtain a desired total amount of purge. This desired total amount of purge gas is adjusted so that the volumetric purge: feed ratio is in the range of 1.0 to 1.6, preferably 1.1 to 1.4. The relative amounts of external purge and internal purge in this total purge gas ranges from 40% external/60% internal to 100% external/0% internal, preferably 60% external/40% internal to 90% external/10% internal.

FIG. 1 shows one embodiment of the invention for the integration of the processing of a refinery fuel gas and a hydrogen plant pressure swing adsorption function. A hydrocarbon feedstock 10 is shown entering a steam reforming plant 12 that produces hydrogen-rich synthesis gas in a stream 14. Pressure swing adsorption unit 16 contains adsorbents selected to remove water, carbon dioxide, methane, carbon monoxide, and nitrogen impurities from synthesis gas stream 14 to produce a hydrogen product stream 20 that is sent to a hydrogen consuming reaction and a tail gas stream 18 that is returned to steam reforming plant 12 as fuel. Further in FIG. 1 is shown a refinery fuel gas stream 50 that is treated in a temperature swing adsorption unit 44 to remove impurities including water, ammonia, and hydrogen sulfide to produce a treated fuel gas stream 48 that is sent to a membrane unit 28 to produce a permeate PSA purge stream 26 that is sent to pressure swing adsorption unit 16 as well as any other pressure swing adsorption units such as PSA unit 24 or other PSA units within a PSA section 22 of the refinery complex. A non-permeate stream 32 is sent to chiller 34 with chilled stream going to separator 38 with a top vapor stream 42 being used to regenerate temperature swing adsorption unit 44. Fuel stream 46 is shown exiting the bottom temperature swing adsorption unit 44. Liquid stream 40 from separator 38 is sent to a fractionation section in a hydrocracking unit or catalytic reforming unit to recover LPG and light naphtha product streams.

Figure 2:
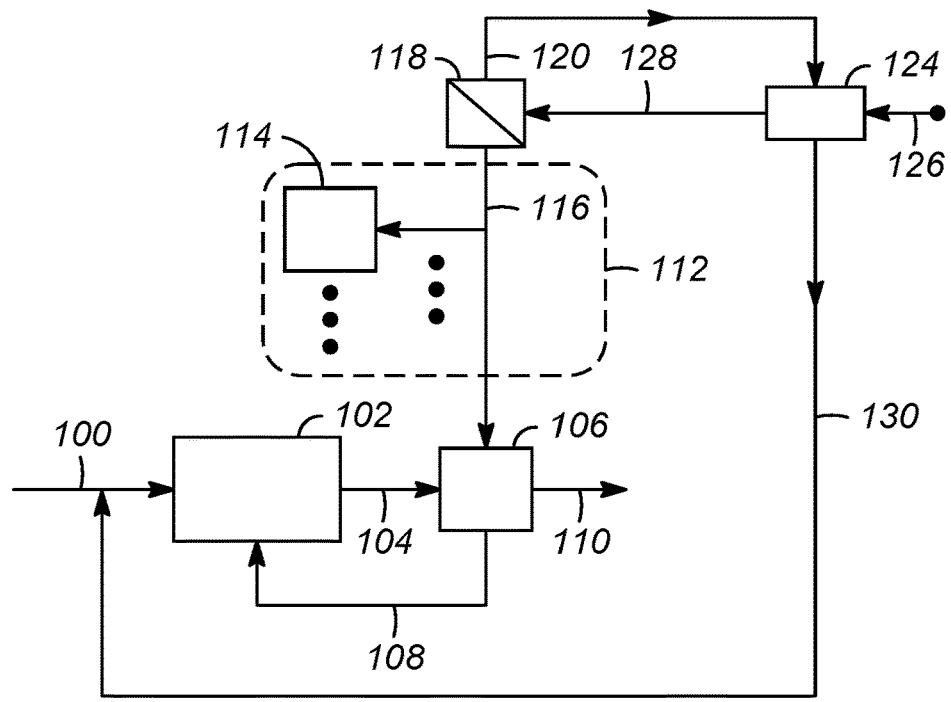
FIG. 2 shows another flow scheme for integration of refinery fuel gas and steam reformer plant pressure swing adsorption.

FIG. 2 shows an embodiment of the invention without the recovery of liquids shown in FIG. 1. In FIG. 2, a hydrocarbon feedstock 100 is sent to a steam reformer 102 to produce a hydrogen-rich synthesis gas 104. Product stream 104 is sent to a pressure swing adsorption unit 106 to separate the synthesis gas stream into a hydrogen product stream 110 and a tail gas stream 108 which contains water, carbon dioxide, methane, carbon monoxide, nitrogen, and un-recovered hydrogen. This tail gas stream 108 is returned to the steam reformer plant as fuel. A refinery fuel gas steam 126 is sent to temperature swing adsorption unit 124 to remove impurities. A treated stream 128 is sent to a membrane unit 118 to produce a purge stream 116 that is sent to pressure swing adsorption unit 106 as well as other PSA, units including PSA unit 114, and other PSA units within PSA zone 112. A temperature swing adsorption regeneration gas stream 120 is a non-permeate stream exiting membrane unit 124. Hydrogen depleted non-permeate stream 130 is mixed with hydrocarbon stream 100 and is used as feedstock for steam reforming reactor 102.

Figure 3:
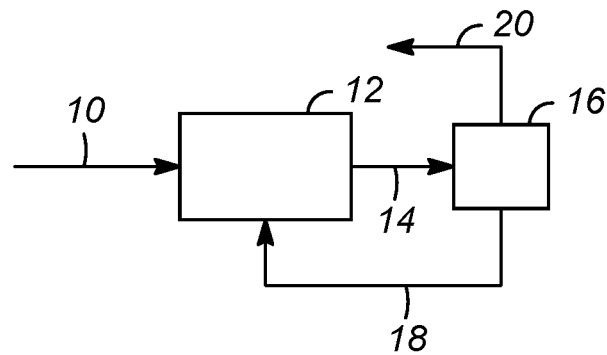
FIG. 3 shows a baseline steam reformer plant for recovering hydrogen.

FIG. 3 is a baseline prior art stream reforming plant configuration that shows a hydrocarbon stream 10 entering steam reformer 12 to produce a hydrogen containing stream 14 that goes to PSA unit 16 where it is separated into hydrogen product stream 20 and tail gas stream 18 that is sent back to steam reformer 12 as fuel. Not shown is that hydrocracker flash gas is sent to be a fuel stream.

Figure 4:
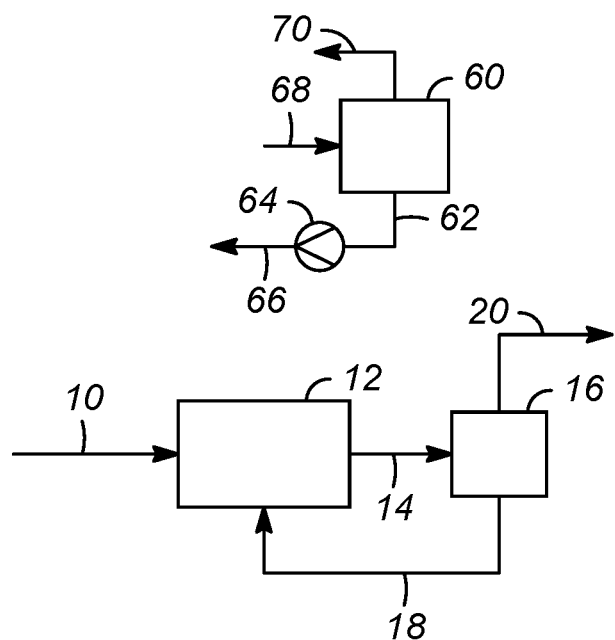
FIG. 4 shows another comparative example for recovering hydrogen.

FIG. 4 is another prior art process and is similar to FIG. 3, except that hydrocracker flash gas 68 is sent to a second, smaller pressure swing adsorption unit 72 for separation into second hydrogen product stream 70 and second tail gas stream 62. Compressor 64 is used to compress tail gas stream 62 and this compressed stream 66 is used as fuel in the refinery complex-A hydrocarbon stream 10 enters steam reformer 12 to produce a hydrogen containing stream 14 that goes to PSA unit 16 where it is separated into hydrogen product stream 20 and a tail gas stream 18 that is sent back to steam reformer 12 as fuel.

Figure 5:
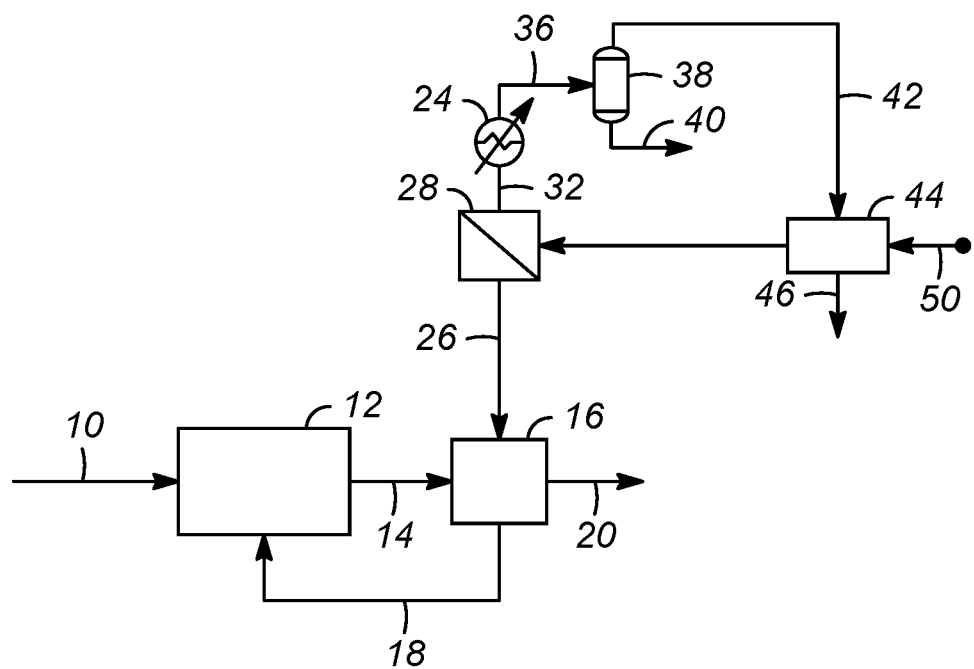
FIG. 5 shows a flow scheme for the present invention with a single pressure swing adsorption unit shown.

FIG. 5 is a simplified version of FIG. 1 that shows an embodiment of the present invention. A hydrocarbon feedstock 10 is shown entering a steam reforming plant 12 that produces a hydrogen-rich synthesis gas in stream 14. Pressure swing adsorption unit 16 contains adsorbents selected to remove water, carbon dioxide, methane, carbon monoxide, and nitrogen impurities from synthesis gas 14 to produce a hydrogen product stream 20 that is sent to a hydrogen consuming reaction and a tail gas stream 18 that is returned to steam reforming plant 12 as fuel. Further in FIG. 5 is shown a refinery fuel gas stream 50 that is treated in a temperature swing adsorption unit 44 to remove impurities including water, ammonia, and hydrogen sulfide to produce a treated fuel gas stream 48 that is sent to a membrane unit 28 to produce a permeate PSA purge stream 26 that is sent to pressure swing adsorption unit 16. A non-permeate stream 32 is sent to chiller 24 with chilled stream going to separator 38 with a top vapor stream 42 being used to regenerate temperature swing adsorption unit 44. Fuel stream 46 is shown exiting the bottom temperature swing adsorption unit 44. Liquid stream 40 from separator 38 is sent to a fractionation section in a hydrocracking unit or catalytic reforming unit to recover LPG and light naphtha product streams.

Example

A simple techno-economic analysis was conducted in order to demonstrate benefits of the invention. This analysis is based on a UniSim® flowsheet model and a detailed, dynamic PSA model of a naphtha steam reforming plant (150 mmscfd PSA product), with hydrocracker flash gas (17 mmscfd) as the source of RFG. The baseline case uses this refinery fuel gas stream as fuel and delivers high purity hydrogen via a prior art H2 PSA unit. An alternative prior art process example adds a small PSA unit (with tail-gas compressor) to recover hydrogen from the refinery fuel gas stream. The new scheme uses a membrane permeate to purge the steam reformer PSA unit, and liquids are recovered from non-permeate. As indicated in Table 2, hydrogen recovery of the steam reformer PSA unit increases from 88.9% to 93.1% due to membrane permeate purge. In addition, hydrocarbon liquids recovered from membrane non-permeate provide significant value. Overall, the invention provides a significant value increase compared to the prior art baseline and alternative flow schemes.

TABLE 2

Techno-Economic Comparison

|  | Baseline Prior Art Process (according to FIG. 3) | Alternative Prior Art Process (according to FIG. 4) | New Scheme (according to FIG. 5) |
| --- | --- | --- | --- |
| H2 Plant PSA H2 Recovery, % | 88.9 | 88.9 | 93.1 |
| Product H2, mmscfd | 150 | 163 | 157 |
| Δ Gross Margin, MMUSD/yr |  |  |  |
| Hydrogen | — | 4.2 | 2.2 |
| LPG | — | — | 6.2 |
| Naphtha | — | — | 4.2 |
| Total | — | 4.2 | 12.6 |
| Δ Power, kW | — | 300 | 110 |
| Δ OPEX, MMUSD/yr | — | 0.10 | 0.04 |
| Δ Gross Profit, MMUSD/yr |  | 4.1 | 12.5 |
| Δ CAPEX, MMUSD |  | 3.3 | 5.2 |
| Simple Payback, yrs |  | 0.8 | 0.4 |

Specific Embodiments

While the following is described in conjunction with specific embodiments, it will be understood that this description is intended to illustrate and not limit the scope of the preceding description and the appended claims.

A first embodiment of the invention is a process for producing hydrogen for a hydrogen consuming process comprising obtaining a gas stream containing hydrogen from a steam reforming hydrogen plant; sending the gas stream to a pressure swing adsorption unit to be separated into a hydrogen stream and a fuel gas stream; purging the pressure swing adsorption unit with an external purge gas stream from a hydroprocessing unit off gas; treating the off gas with a thermal swing adsorption unit to remove water and other impurities prior to purging the pressure swing adsorption unit; and using a protective adsorbent layer in the pressure swing adsorption unit at the product-hydrogen end of the bed to adsorb impurities from the external purge gas. An embodiment of the invention is one, any or all of prior embodiments in this paragraph up through the first embodiment in this paragraph wherein the external purge gas stream is a flash gas stream from a hydrocracking reactor. An embodiment of the invention is one, any or all of prior embodiments in this paragraph up through the first embodiment in this paragraph wherein the external purge gas stream is a flash gas stream from a hydrotreating reactor. An embodiment of the invention is one, any or all of prior embodiments in this paragraph up through the first embodiment in this paragraph wherein the external purge gas stream is at a pressure of about 35 to 276 kPa (5 to 40 psig) when entering the pressure swing adsorption unit. An embodiment of the invention is one, any or all of prior embodiments in this paragraph up through the first embodiment in this paragraph wherein the external purge gas stream is mixed with an internal purge gas stream obtained from de-pressurizing a bed in the pressure swing adsorption unit. An embodiment of the invention is one, any or all of prior embodiments in this paragraph up through the first embodiment in this paragraph wherein the flow rate of the external purge gas stream is measured and the internal purge gas stream is adjusted to obtain a desired total purge gas flow. An embodiment of the invention is one, any or all of prior embodiments in this paragraph up through the first embodiment in this paragraph wherein the ratio of external to internal purge flows is about 4060 to 1000. An embodiment of the invention is one, any or all of prior embodiments in this paragraph up through the first embodiment in this paragraph wherein the ratio of external to internal purge flows is about 6040 to 9010. An embodiment of the invention is one, any or all of prior embodiments in this paragraph up through the first embodiment in this paragraph wherein the hydrogen is sent to one or more reactors selected from the group consisting of a hydrocracking reactor, a hydrotreating reactor, an aromatics conversion reactor, and an isomerization reactor. An embodiment of the invention is one, any or all of prior embodiments in this paragraph up through the first embodiment in this paragraph wherein the treated purge gas stream is sent through a membrane unit to produce a non-permeate stream depleted in hydrogen and a permeate hydrogen stream to be sent as the external purge gas stream through the pressure swing adsorption unit. An embodiment of the invention is one, any or all of prior embodiments in this paragraph up through the first embodiment in this paragraph wherein the treated purge gas stream is at a pressure of about 1379 to 4137 kPa (200 to 600 psig). An embodiment of the invention is one, any or all of prior embodiments in this paragraph up through the first embodiment in this paragraph wherein the temperature swing adsorption unit is regenerated with a gas stream from the non-permeate stream. An embodiment of the invention is one, any or all of prior embodiments in this paragraph up through the first embodiment in this paragraph wherein the protective adsorbent layer comprises from about 5% to 25% of the pressure swing adsorption unit bed volume. An embodiment of the invention is one, any or all of prior embodiments in this paragraph up through the first embodiment in this paragraph wherein the protective adsorbent layer is comprised of silica gel. An embodiment of the invention is one, any or all of prior embodiments in this paragraph up through the first embodiment in this paragraph wherein the protective adsorbent layer is comprised of activated alumina. An embodiment of the invention is one, any or all of prior embodiments in this paragraph up through the first embodiment in this paragraph wherein the non-permeate stream is chilled to about 0° to 20° C. to produce a liquid hydrocarbon stream. An embodiment of the invention is one, any or all of prior embodiments in this paragraph up through the first embodiment in this paragraph wherein the liquid stream is sent to fractionation section of a hydroprocessing unit to recover liquefied petroleum gas and light naphtha. An embodiment of the invention is one, any or all of prior embodiments in this paragraph up through the first embodiment in this paragraph wherein the liquid stream is sent to a fractionation section of a catalytic reforming unit to recover liquefied petroleum gas and light naphtha. An embodiment of the invention is one, any or all of prior embodiments in this paragraph up through the first embodiment in this paragraph wherein the non-permeate stream is used as feedstock in steam reforming reactor.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. A process for producing hydrogen for a hydrogen consuming process comprising:
   obtaining a gas stream containing hydrogen from a steam reforming hydrogen plant;
   sending the gas stream to a pressure swing adsorption unit to be separated into a hydrogen stream and a fuel gas stream;
   purging said pressure swing adsorption unit with an external purge gas stream from a hydroprocessing unit off gas;
   treating said off gas with a thermal swing adsorption unit to remove water and other impurities prior to purging said pressure swing adsorption unit; and
   using a protective adsorbent layer in said pressure swing adsorption unit at the product-hydrogen end of the bed to adsorb impurities from said external purge gas.

2. The process of claim 1 wherein said external purge gas stream is a flash gas stream from a hydrocracking reactor.

3. The process of claim 1 wherein said external purge gas stream is a flash gas stream from a hydrotreating reactor.

4. The process of claim 1 wherein said external purge gas stream is at a pressure of about 35 to 276 kPa (5 to 40 psig) when entering said pressure swing adsorption unit.

5. The process of claim 1 wherein said external purge gas stream is mixed with an internal purge gas stream obtained from de-pressurizing a bed in the pressure swing adsorption unit.

6. The process of claim 5 wherein the flow rate of said external purge gas stream is measured and said internal purge gas stream is adjusted to obtain a desired total purge gas flow.

7. The process of claim 6 wherein the ratio of external to internal purge flows is about 60:40 to 90:10.

8. The process of claim 1 wherein said separated hydrogen stream is sent to one or more reactors selected from the group consisting of a hydrocracking reactor, a hydrotreating reactor, an aromatics conversion reactor, and an isomerization reactor.

9. The process of claim 1 wherein said treated off gas stream is sent through a membrane unit to produce a non-permeate stream depleted in hydrogen and a permeate hydrogen stream to be sent as said external purge gas stream through said pressure swing adsorption unit.

10. The process of claim 1 wherein said treated off gas stream is at a pressure of about 1379 to 4137 kPa (200 to 600 psig).

11. The process of claim 1 wherein said temperature swing adsorption unit is regenerated with a gas stream from said non-permeate stream.

12. The process of claim 1 wherein said protective adsorbent layer comprises from about 5% to 25% of said pressure swing adsorption unit bed volume.

13. The process of claim 1 wherein said protective adsorbent layer is comprised of silica gel.

14. The process of claim 1 wherein said protective adsorbent layer is comprised of activated alumina.

15. The process of claim 9 wherein said non-permeate stream is chilled to about 0° to 20° C. to produce a liquid hydrocarbon stream.

16. The process of claim 15 wherein said liquid stream is sent to a fractionation section of a hydroprocessing unit to recover liquefied petroleum gas and light naphtha.

17. The process of claim 15 wherein said liquid stream is sent to a fractionation section of a catalytic reforming unit to recover liquefied petroleum gas and light naphtha.

18. The process of claim 9 wherein said non-permeate stream is used as feedstock in steam reforming reactor.

* * * * *